United States Patent [19]

Sweeney

[11] Patent Number: 4,723,441
[45] Date of Patent: Feb. 9, 1988

[54] PIPING SYSTEM FOR HAZARDOUS FLUIDS

[75] Inventor: John M. Sweeney, Sylmar, Calif.

[73] Assignee: Ply-Flow Engineering, Inc., Sylmar, Calif.

[21] Appl. No.: 796,005

[22] Filed: Nov. 7, 1985

[51] Int. Cl.[4] ............................................. G01M 3/04
[52] U.S. Cl. .................................... 73/40.5 R; 73/46; 73/49.1
[58] Field of Search ............... 73/46, 40.5 R, 40, 49.1, 73/49.5; 138/104, 114; 285/13, 133.1, 93

[56] References Cited

U.S. PATENT DOCUMENTS

| 1,481,255 | 1/1924 | Cumfer | 138/114 |
| 2,860,311 | 11/1958 | Balian | 285/133.1 |
| 3,430,484 | 3/1969 | Wittgenstein | 73/40.5 R |
| 3,907,336 | 9/1975 | Siegmund | 285/93 |
| 4,380,168 | 4/1983 | Ibe | 73/40.5 R |
| 4,420,970 | 12/1983 | Organi | 73/46 |
| 4,445,332 | 5/1984 | Thies et al. | 285/13 |

FOREIGN PATENT DOCUMENTS

| 227590 | 7/1909 | Fed. Rep. of Germany . |
| 1193000 | 5/1965 | Fed. Rep. of Germany ........ 285/93 |
| 1234163 | 2/1967 | Fed. Rep. of Germany ... 285/133.1 |
| 854189 | 11/1960 | United Kingdom ..................... 73/46 |
| 2023296 | 12/1979 | United Kingdom ................ 138/104 |

Primary Examiner—Stewart J. Levy
Assistant Examiner—Hezron E. Williams
Attorney, Agent, or Firm—Louis J. Bachand

[57] ABSTRACT

The leakage of hazardous fluid from the pipe sections or from between the pipe sections is monitored by butting concentric pipe section sets which define a cylindrical leakage collection and monitoring means to a special fitting which has a pair of seals and a passage to the collection means therebetween, so that leakage at the pipe intersections is collected and passed to the normal pipe-defined leakage collection and detection apparatus used to monitor pipe section leakage.

13 Claims, 4 Drawing Figures

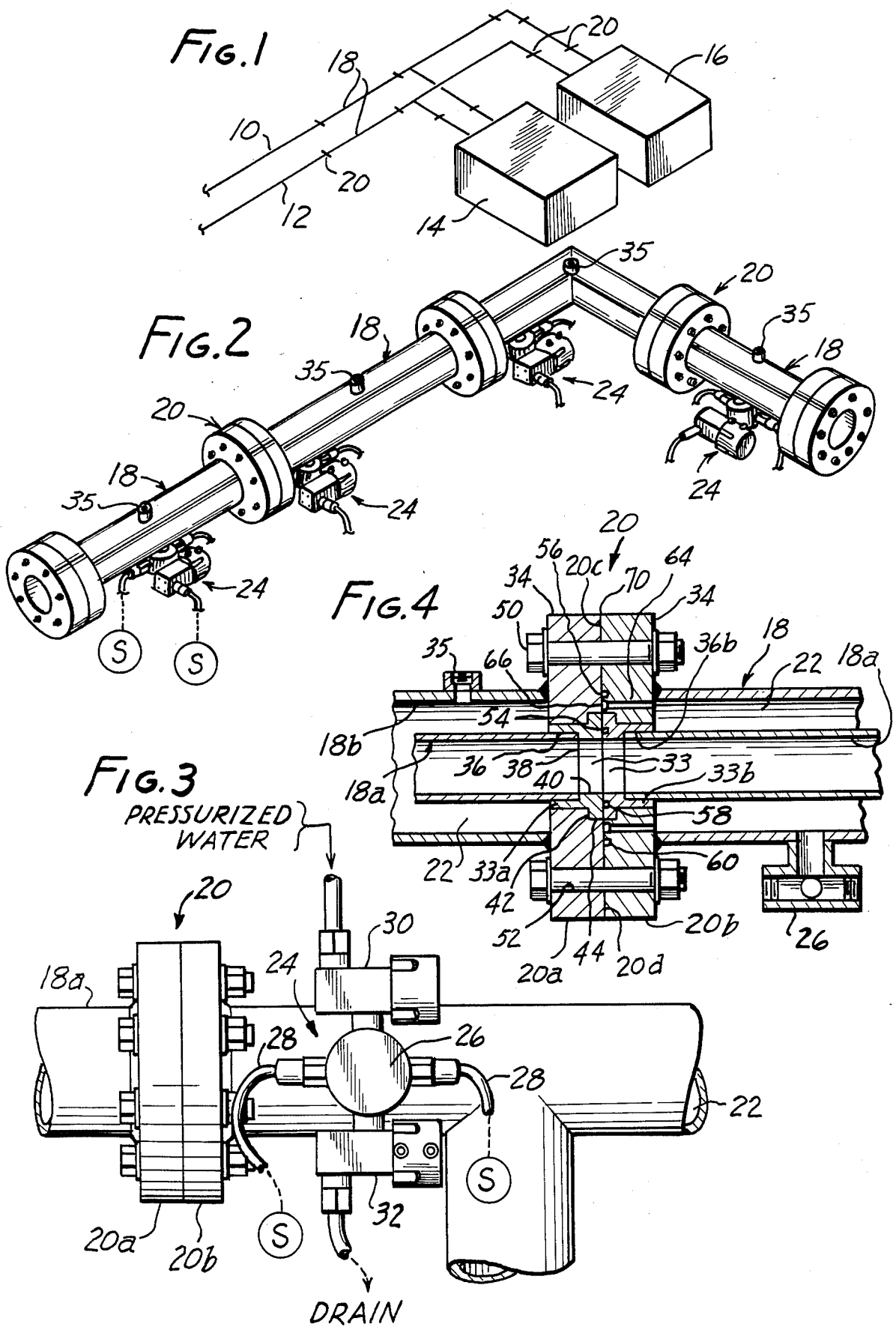

PIPING SYSTEM FOR HAZARDOUS FLUIDS

TECHNICAL FIELD

This invention has to do with piping systems and more particularly with method and apparatus for piping systems used in the transport of hazardous chemicals through a manufacturing area, such as is done in automated and semi-automated semi-conductor manufacturing and etching facilities. The present piping system affords ease of assembly and maintenance while offering monitoring and collection of leakage at all parts of the system, both at the pipe sections and at the junctions between pipe sections.

BACKGROUND OF THE INVENTION

In such facilities, acid and wash cycles are used to prepare the integrated circuit chips, with the necessary chemicals being supplied through a network of piping from a central supply to individual work stations comprising many sections of pipe joined by sealing fittings. Because the work stations are typically numerous and distributed through a large area, and to insure sufficient pressure at each station the chemicals are supplied under moderate pressures to the station and controlled by valves at the station.

The treating chemicals are hazardous to humans and accordingly are generally transported in piping which is provided with safety features against leakage or rupture.

SUMMARY STATEMENT OF THE INVENTION

The invention has as an object the provision of piping systems for the transport of hazardous chemical fluids in which leakage from the piping or from the seals between successive sections of the piping is captured and monitored. The invention has as a further object the provision of a novel sealing fitting structure which cooperates with monitored, double-walled piping systems to enable ready detection of leakage at the pipe section junctions, as well as at the pipe sections themselves.

These and other objects of the invention to become apparent hereinafter are realized in accordance with the invention in a piping system adapted for transport of hazardous fluids through manufacturing areas, the piping system comprising a series of pipe sections intercoupled by sealing fittings connected to the opposed ends of successive pipe sections, means to monitor fluid leakage from the pipe sections including sensing means and collector means to collect the leakage, and means to monitor leakage from the sealing fittings beyond the pipe sections including means communicating fluid leakage at the sealing fitting to the pipe section leakage collector for sensing there.

In particular embodiments, the piping system comprises a series of concentric different diameter pipe sections, the collector means being partially defined by the interspace between the concentric pipe sections; the sealing fittings comprise opposed flange means adapted to seal respective ends of successive pipe sections, the flange means defining a cooperating groove and O-ring seal arrangement for effecting sealing of the pipe sections beyond the pipe section ends; and the leakage communicating means comprises a passage communicating the collector means with the sealing fittings.

In further embodiments, the invention provides such a piping system in which the pipe section series is a first series, and including also a second series of pipe sections enclosing the first series in collector means partially defining relation, successive pipe sections being supported in sealing relation by opposed flange means common to the first and second pipe sections and defining the remainder of the collector means; and, the leakage communicating means comprises a passage opening in the face of the flange means and extending between the first and second pipe series, and including also a second groove and O-ring seal arrangement bracketing with the pipe section seal the flange face passage opening in inward and outward sealing relation.

In a preferred embodiment, there is provided a piping system for transport of hazardous fluids in manufacturing areas, the piping system comprising successive sets of first and second series of concentric pipe sections defining a fluid collecting interspace between them, cooperating sealing fittings in abutting relation between successive pipe section sets, each comprising a center portion and a flange portion, and means to communicate the space between the abutting flange portions with the fluid collecting interspace, whereby the fluid leaking between the flanges can be detected by sensors monitoring the interspace and in the absence of pipe section leakage.

In this embodiment, typically, the communicating means comprises a passage opening at the interface of the flanges and extending through at least one of the sealing fitting flanges, and including also seals on both sides of the passage opening; the first pipe sections are secured to the sealing fitting center portions and second pipe sections to the sealing fitting flange, the flanges being fastened together circumferentially to support the first and second pipe sections in their relative positions; the first pipe sections are supportably received by the sealing fitting center portion; the second pipe sections are butted to the sealing fitting flange portion; one of the sealing fitting flanges is ported to define an opening at the face of the flange, and a connecting passage through the flange, the passage opening at the other side of the flange into the collector means being defined by the first and second pipe section set supported by the sealing fitting, and there is further provided means sensing the presence of hazardous fluid in the collector means whether from pipe section leakage or leakage between the sealing fitting flanges communicated to the collection means via the passage; there is further provided cooperating O-ring seals inward and outward of the passage opening in the flange face, fluid leakage from the inward of the seals being passed into the collection means upon occurrence; and typically the passage is square in cross section.

In another embodiment, the invention provides a novel split sealing fitting for successive concentric pipe section sets which need to be monitored for fluid leakage, the fitting comprising first and second mating halves defining opposed radially inner shoulders adapted to mount the inner pipe sections of the sets and opposed radially outer shoulders adapted to mount the outer pipe sections of the sets, a passage through at least one half of the fitting to communicate the interface of the halves with the volume between the inner and outer pipe sections, and flexible seal means on opposite sides of the passage against fluid leakage from the inner pipe junction with the inner shoulder elsewhere than into the passage.

The invention further contemplates a method of monitoring fluid leakage at the intersections of successive pipe sections in a piping system, including radially double sealing the interface at the intersections, and communicating the space between the successive seals with a collection means adapted to monitor the presence of leaked fluid.

THE DRAWING

The invention will be further described as to an illustrative embodiment in conjunction with the attached drawing in which:

FIG. 1 is a schematic view of a manufacturing area piping system supplying chemicals to adjacent work stations;

FIG. 2 is a perspective view of the piping system according to the invention showing multiple sealing fittings and leakage monitoring apparatus;

FIG. 3 is a fragmentary detail view of a portion of the piping system; and,

FIG. 4 is a view in section of the sealing fitting according to the invention.

DETAILED DESCRIPTION

As will be evident from the foregoing, the invention provides for the collection and thus the detection of leakage at the seals between successive pipe sections, by utilizing the collection and detection apparatus already provided around the pipe sections, and communicating the pipe section collection apparatus with the sealing interface. In this manner, the effective enclosing of the pipe sections by a second outboard pipe section system, to define an interspace which can then be monitored for presence of hazardous fluids indicative of leakage, is made made fully effective on a piping system-wide basis by the typing in of the seal interface leakage status with the pipe section collection and detection arrangement. The sealing fitting provided by the invention which enables this result has a double O-ring seal outward of the inner pipe section, and a passage through the fitting to the pipe section leakage collection arrangement opening into the interface between the sealing fitting halves and between the O-ring seals, whereby any leakage through the first seal is passed via the passage to the pipe section collector, where the monitors will detect it.

Thus the invention provides the first piping system for hazardous fluid transport in manufacturing area as where both the seals and the pipe sections are leakage monitored.

With reference now to the drawings in detail, in FIG. 1 a pair of piping system lines 10, 12 carry acids, etchants, rinse liquids and the like to work stations 14, 16. Within the work stations 14, 16, which are but typical of numerous such stations in a large manufacturing facility, the precursors of products to be manufactured, e.g. integrated circuit chips, are automatically manipulated and exposed to one or another of the chemicals from the piping systems 10, 12, in a predetermined sequence controlled by valves not shown to produce the desired part. Excess fluids are carried away in drains not shown.

The respective piping systems 12, 14 are modular and comprise successive sections of pipe 18, joined at intersections 20. Each piping 12, 14 section 18 is double walled in that there is an inner pipe section 18a and an outer pipe section 18b, see FIG. 4, so that the hazardous fluids are carried in the inner section 18a, and any leakage therefrom is collected in the interspace 22 defined by the pipe sections 18a, 18b. Each successive section 18 is provided with monitoring apparatus 24 comprising, with particular reference to FIGS. 2 and 3, a leak detection fitting 26 into which first and second optical liquid sensor probes 28 are fitted commnicating with redundant sensors (S) of known design, to sense gravity flow of liquid into the field of the sensor probes. Test valves 30, 32 are also connected to the fitting 26. Valve 30 is connected to a pressurized water supply (not shown) for purposes of controllably flooding the interspace 22 to test integrity in cooperation with drain valve 32 through which the water is removed. The interspace 22 is also provided with pressure relief vents 35 shown open but which are generally suitably capped.

As best shown in FIG. 4, the piping sections 18 comprise inner pipe sections 18a which are typically fabricated of PVDF (polyvinyldifluoride resin) a high performance, costly resin, and outer pipe sections 18b which are typically clear Schedule 40 PVC (polyvinylchloride resin) pipe about 4 inches in diameter. The pipe sections are assembled by interfitting the inner sections 18a with the sealing fitting 20. The sealing fitting 20 comprises left and right hand halves 20a, 20b which mate as shown. Each half 20a, 20b has a center portion 33 and a flange portion 34. Preferably, and as shown, the inner portion 33 is a shaped element 33a of PVDF adapted to slidably and snugly receive the terminus of the pipe section 18a in a stepped bore 36 which defines an annular inner shoulder 38 to which the pipe 18a ends abut, so that the inner periphery 40 of the insert element 33a forms a continuation of the flow path defined by the interior of the pipe section 18a, as shown.

The outer periphery of the insert element 33a defines an outer annular shoulder 42 which complements the split annular groove 44 in the flange portion 34 of the sealing fitting halves 20a, 20b, whereby assembly of the sealing fitting halves and bolting around its circumference by through bolts 50 in holes 52 traps the insert element in place as shown.

Outer pipe section 18b is typically welded to the opposing surface of the flange 34, as shown.

The ease of assembly of the sealing fitting 20 is evident. Original installation, replacement of maintenance are readily accomplished. Surprisingly, with all the convenience of use, the present piping system further affords total leakage collection and monitoring, including at the sealing fitting area.

With reference again to FIG. 4, the face 20c of fitting half 20b is provided with an inner sealing groove 54 and an outer sealing groove 56, the inner groove being just outboard of the locus of interfittment of the pipe 18a end and the insert element bore 36. An O-ring 58 slightly oversized is placed in the groove 54 as shown to bear against the face 20d of the opposing flange 34 of sealing fitting half 20a in sealing relation. A second seal is provided by O-ring 60 in outer groove 56; this seal is well beyond the locus of connection of the pipe section 18b and the insert element 33a, 33b.

Monitoring and collection of leakage with the aforedescribed assembly is through the provision of a passage 64 through the flange 34 of sealing fitting half 20b, which extends from its opening 66 in the face 20c of the fitting half through to the interspace 22 defined by the pipe sections 18a, 18b. The passage 64 is suitably square in cross-section.

As will be noted, the passage 64 is in open communication with the interspace 22 at one end with the interface 70 of the fitting halves 20a, 20b, which is nominally of no dimension but which will leak fluids. The O-ring seals 58, 60 bracket the passage opening 66, so that any fluid passing the inner seal ring 58 will pass into the passage 64 rather than through the second, outer seal ring 60. In this manner, the leaking fluids between the sealing fitting halves 20a, 20b are received in the interspace 22 and are monitored and detected as though they were from leaking pipe sections. In this manner, the entire piping system, pipe sections and pipe junctions is monitored, and with no additional detection equipment beyond that sufficing for the pipe sections alone.

Advantageously, the addition of the seal leakage detection does not interfere with the ease of assembly, maintenance and repair characteristic of the junction system provided, so that overall a superior performing system, one that is safer, and as well easy to install and revise is realized in accordance with the invention.

I claim:

1. Piping system for transport of hazardous fluids through manufacturing areas, said piping system comprising successive sets of first and second series of concentric pipe sections defining a series of separate fluid collecting interspaces between them, cooperating sealing fittings in abutting relation between successive pipe section sets, each sealing fitting comprising a center portion through which said first series of pipe sections forms a continuous passage, and a flange portion separating said second series of pipe sections to form with said first and second pipe section series discontinuous interspaces on either side of said fitting flanges, said flange portions having cooperating seal elements defining a sealed area between said abutting flange portions, means sensing the presence of hazardous fluid in said interspaces, and means to communicate the sealed area between said abutting flange portions with one of said interspaces, said communicating means comprising a passage extending from between said seal elements and opening to one of said interspaces to be monitored, whereby said fluid leaking into between said seals can be detected by said sensing means.

2. Piping system according to claim 1, in which said piping system comprises a series of concentric different diameter pipe sections, said collector means being partially defined by the interspace between said concentric pipe sections.

3. Piping system according to claim 1, in which said leakage communicating means comprises a passage communicating said collector means with said sealed area.

4. Piping system for transport of hazardous fluids through manufacturing areas, said piping system comprising a series of pipe sections intercoupled by sealing fittings connected to the opposed ends of successive pipe sections, means to monitor fluid leakage from said pipe sections including sensing means and collector means to collect said leakage, said collector means being defined by said fittings and being discontinous in pipe section corresponding relation, and means to monitor leakage from said sealing fittings beyond said pipe sections including means communicating fluid leakage at said sealing fitting to said pipe section leakage collector for sensing there, said sealing fittings comprising opposed flange means adapted to seat respective ends of successive pipe sections, said flange means defining a cooperating groove and O-ring seal arrangement for effecting sealing of said pipe sections beyond said pipe section ends.

5. Piping system for transport of hazardous fluids in manufacturing areas, said piping system comprising successive sets of first and second series of concentric pipe sections defining a series of separate fluid collecting interspaces between them, cooperating sealing fittings in abutting relation between successive pipe section sets each sealing fitting comprising a center portion through which said first series of pipe sections forms a continuous passage, and a flange portion separating said second series of pipe sections and forming between said fitting flanges and with said first and second pipe section series discontinuous interspaces on either side of said fitting flanges, means sensing the presence of hazardous fluid in said interspaces, means to seal said series of pipe sections including radially spaced O-rings seated on said flanges, and means to communicate the sealed area between said abutting flange portions with one of said interspaces, said means comprising a passage extending from between said seals and opening to only one of said discontinuous interspaces, whereby said fluid leaking between said flanges can be detected by sensors monitoring said interspaces.

6. Piping system according to claim 5, in which said communicating means comprises a passage opening at the interface of said flanges and extending through at least one of sealing fitting flanges, and including also seals on both sides of said passage opening.

7. Piping system according to claim 6, in which said first pipe sections are secured to said sealing fitting center portions and second pipe sections to said sealing fitting flange, said flanges being fastened together circumferentially to support said first and second pipe sections in their relative positions.

8. Piping system according to claim 7, in which said first pipe sections are supportably received in said sealing fitting center portion.

9. Piping system according to claim 8, in which said second pipe sections are butted to said sealing fitting flange portion.

10. Piping system according to claim 9, in which one of said sealing fitting flanges is ported to define an opening at the face of said flange, and a connecting passage through said flange, said passage opening at the other side of said flange into the collector means defined by the first and second pipe section set supported by the sealing fitting, and including also means sensing the presence of hazardous fluid in said collector means whether from pipe section leakage or leakage between said sealing fitting flanges communicated to said collection means via said passage.

11. Piping system according to claim 10, including also cooperating O-ring seals inward and outward of said passage opening in said flange face, fluid leakage from the inward of which seals being passed into said collection means upon occurrence.

12. Piping system according to claim 11, in which said passage is square in cross section.

13. Split sealing fitting for successive concentric pipe section sets which need to be monitored for fluid leakage, said fitting comprising first and second halves defining opposed inner shoulders adapted to mount the inner pipe sections of said sets and opposed outer shoulders adapted to mount the outer pipe sections of said sets, a passage through at least one half of said fitting to communicate the interface of said halves with the volume between said inner and outer pipe sections, and flexible seal means on opposite sides of said passage against fluid leakage from said inner pipe junction with said inner shoulder elsewhere than into said passage.

* * * * *